US 6,840,163 B2

(12) United States Patent
Oldani et al.

(10) Patent No.: US 6,840,163 B2
(45) Date of Patent: Jan. 11, 2005

(54) AUTOMATIC DEVICE FOR HEATING AND FROTHING A LIQUID, IN PARTICULAR MILK

(75) Inventors: Renzo Oldani, Villastanza di Parabiago (IT); Eliano Bottelli, Villastanza di Parabiago (IT)

(73) Assignee: Rancilio Macchine per Caffe' S.p.A., Villastanza di Parabiago (IT)

( * ) Notice: Subject to any disclaimer, the term of this patent is extended or adjusted under 35 U.S.C. 154(b) by 0 days.

(21) Appl. No.: 10/312,367

(22) PCT Filed: Jun. 19, 2001

(86) PCT No.: PCT/EP01/06966

§ 371 (c)(1),
(2), (4) Date: Jul. 9, 2003

(87) PCT Pub. No.: WO01/97668

PCT Pub. Date: Dec. 27, 2001

(65) Prior Publication Data

US 2004/0107843 A1 Jun. 10, 2004

(30) Foreign Application Priority Data

Jun. 23, 2000 (IT) .................................... TO2000A0616

(51) Int. Cl.[7] .......................... A47J 31/40; A47J 31/44; A47J 31/46; A47J 31/58; A23C 9/00
(52) U.S. Cl. .......................... 99/453; 99/293; 99/323.1; 99/452
(58) Field of Search .................... 99/452–455, 275–279, 99/293–295, 291, 289 R, 284–286, 300, 302 R, 323.1–323.3; 261/78.1, DIG. 16, DIG. 76, 121.1, 126; 366/101, 163.1, 163.2, 167.1; 426/477, 523

(56) References Cited

U.S. PATENT DOCUMENTS

| | | | | |
|---|---|---|---|---|
| 4,735,133 A | * | 4/1988 | Paoletti | 99/454 |
| 4,800,805 A | | 1/1989 | Mahlich et al. | |
| 4,852,473 A | * | 8/1989 | Azpitarte Bolivar | 99/293 |
| 4,949,631 A | * | 8/1990 | Fregnan | 99/452 |
| 5,052,289 A | * | 10/1991 | Di Girolamo | 99/452 |
| 5,265,519 A | * | 11/1993 | Schiettecatte et al. | 99/293 |
| 5,335,588 A | | 8/1994 | Mahlich | |
| 5,464,574 A | * | 11/1995 | Mahlich | 261/124 |
| 5,768,981 A | * | 6/1998 | Cicchetti | 99/453 |
| 6,681,685 B2 | * | 1/2004 | Mahlich | 99/453 |

FOREIGN PATENT DOCUMENTS

| | | |
|---|---|---|
| DE | 297 21 055 | 4/1998 |
| EP | 0 287 906 | 10/1988 |
| FR | 2 604 077 | 3/1988 |
| GB | 382 972 | 11/1932 |
| IT | TO2000U000076 | 11/2001 |

OTHER PUBLICATIONS

English Translation of Text and Drawings of Italian TO2000U000076 (attached to Italian Application).

* cited by examiner

Primary Examiner—Timothy F. Simone
(74) Attorney, Agent, or Firm—RatnerPrestia (57) ABSTRACT

An automatic device for heating and frothing a liquid, in particular milk, comprises a container (1) for the liquid, inside which a first tube (6) for introducing pressurised steam into the liquid is removably mounted. The first tube (6) has an inlet in correspondence of the bottom of the container (1), for receiving steam from a duct located within a support base (3) of the container (1), and is secured, for at least part of its length, to a second tube (7) for introducing air into the liquid.

19 Claims, 9 Drawing Sheets

AUTOMATIC DEVICE FOR HEATING AND FROTHING A LIQUID, IN PARTICULAR MILK

The present invention concerns an automatic device for heating and frothing a liquid, in particular milk.

Preferably, the invention is applied in espresso coffee machines for bars, for producing frothy hot milk to be used e.g. in preparing cappuccinos, and the following description will refer to such a preferred application.

It is known that, in order to produce milk froth by means of espresso coffee machines, the operator utilises a container into which he pours a certain quantity of milk; then he introduces steam into the milk by a nozzle while stirring the container, so as to create a certain turbulence in the milk and incorporate the ambient air necessary to form the froth.

The characteristics and the quantity of the froth produced depend on the modalities of milk stirring and steam introduction, and therefore on the sensitivity and the skill of each operator. Thus, such characteristics, and therefore the characteristics of the cappuccino in which the frothy milk is used, change from one operator to another and may be wholly unsatisfactory for the client, even if the operator judges them optimal.

Moreover, with the present technique problems may arise also from the hygienic standpoint, due in particular to the presence of milk crusts on the nozzle tip that are produced by successive frothing operations and that can remain exposed to air for a certain time.

A solution of the problems related to the dependency of the product quality on the individual operator is the subject matter of French patent application No. 2,604,077. That application discloses a device in which the steam nozzle is secured to an air feed duct, which has a bottom axial opening for air outlet arranged in front of the steam outlet opening of the nozzle, so that the steam licks the air jet and generates the required turbulence. Such a solution requires, for a proper operation, the presence of a chamber for mixing air and steam before introducing them into the liquid, and this makes the structure rather complex. Moreover, it leaves the problems of hygienic nature unsolved.

The aim of the invention is to provide an automatic heating and frothing device, which allows producing a froth with substantially constant characteristics, is of simple structure and does not give rise to the above mentioned hygienic problems.

The characteristics of the invention will become apparent from the appended claims.

A device comprising a container for the liquid having a bottom to which there are connected means for introducing pressurised steam into the liquid, according to the non-characterising clause of claim 1, is disclosed in Utility Model Application No. TO 2000 U 000076.

For a better understanding, reference is made to the accompanying drawings, which show a preferred embodiment of the invention, given by way of non limiting example, and in which.

Figure 1:
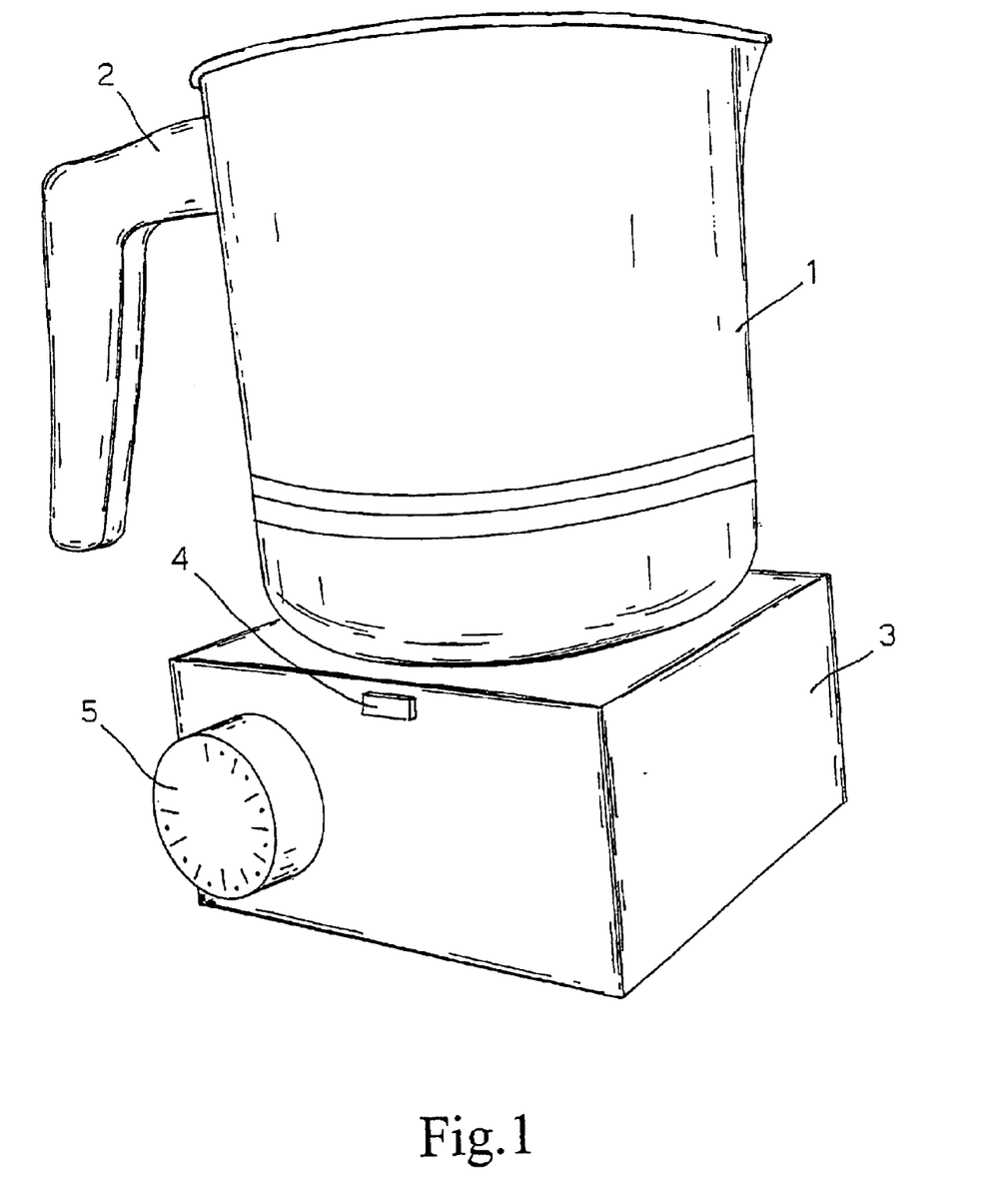
FIG. 1 is a side view of the device according to a first embodiment of the invention.

As shown in FIG. 1, the device essentially comprises a container 1 with a handle 2, mounted on a base 3. The base can be connected to the source of pressurised steam provided in a conventional espresso coffee machine (not shown) or it is internally equipped with an own pressurised steam source, independent of the source of the coffee machine. Base 3 further is equipped with an on/off switch 4 and a timer, operated through a control knob 5 and controlling the opening of an electric valve in a duct, internal to base 3 and not shown in the drawing, delivering steam to the container.

For sake of simplicity, the drawing shows neither the means for electric power supply of the device, nor the connections, if any, with the espresso coffee machine, nor the water feed/discharge ducts for the internal steam source, if any.

Figure 2:
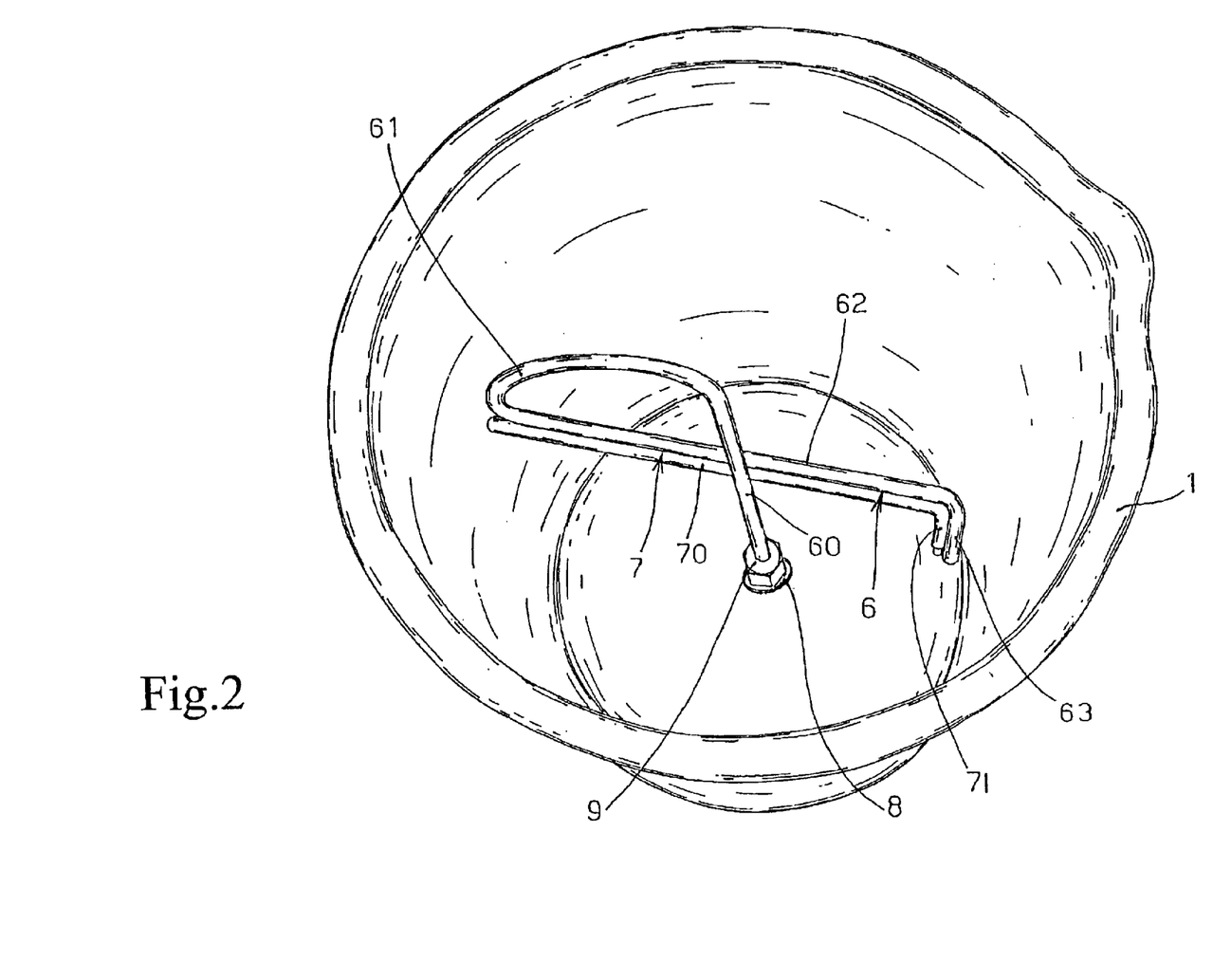
FIGS. 2 and 3 are perspective top and bottom views, respectively, of the milk container of the embodiment shown in FIG. 1.
Figure 3:
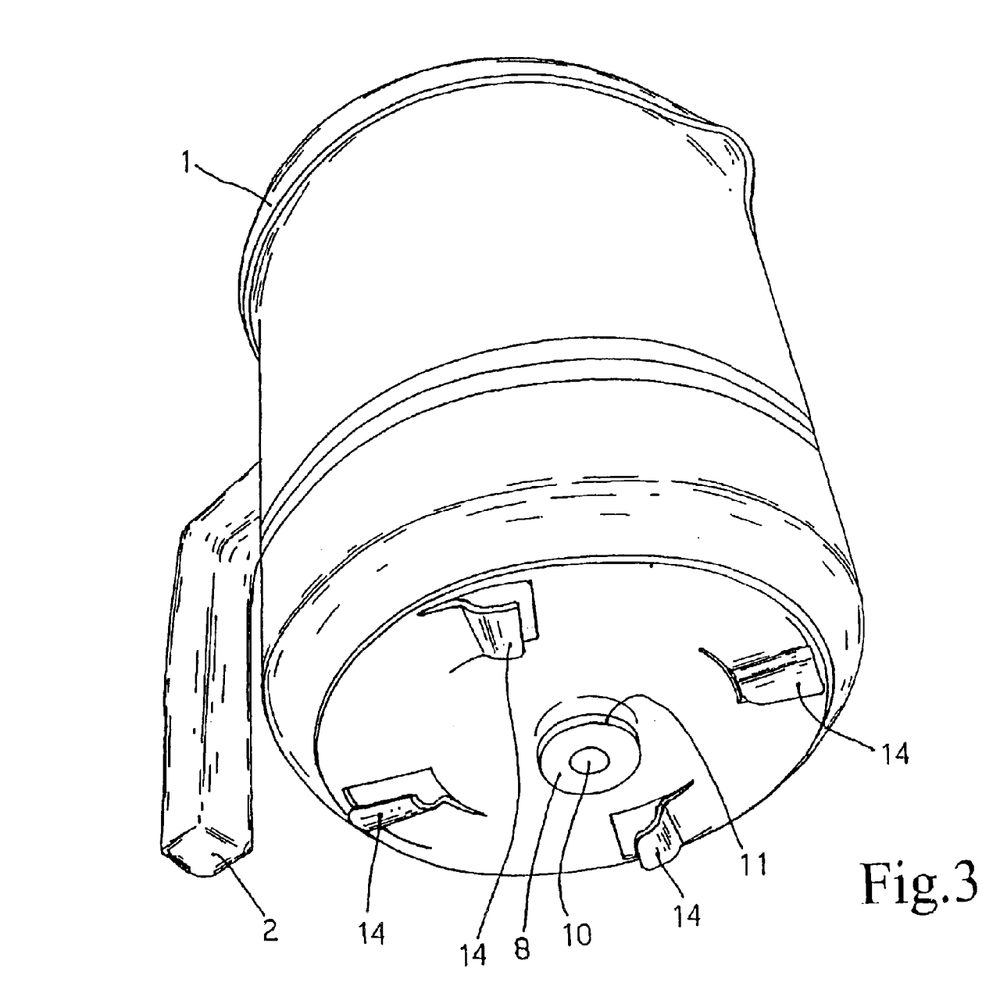

Referring to FIGS. 2 and 3, a first tube 6, intended to introduce into the milk the steam supplied through the duct internal to base 3 (FIG. 1), is removably mounted on the bottom of container 1, inside the container itself. Such a tube 6 is secured to a second tube 7 intended to introduce the air required to produce the froth.

Figure 6:
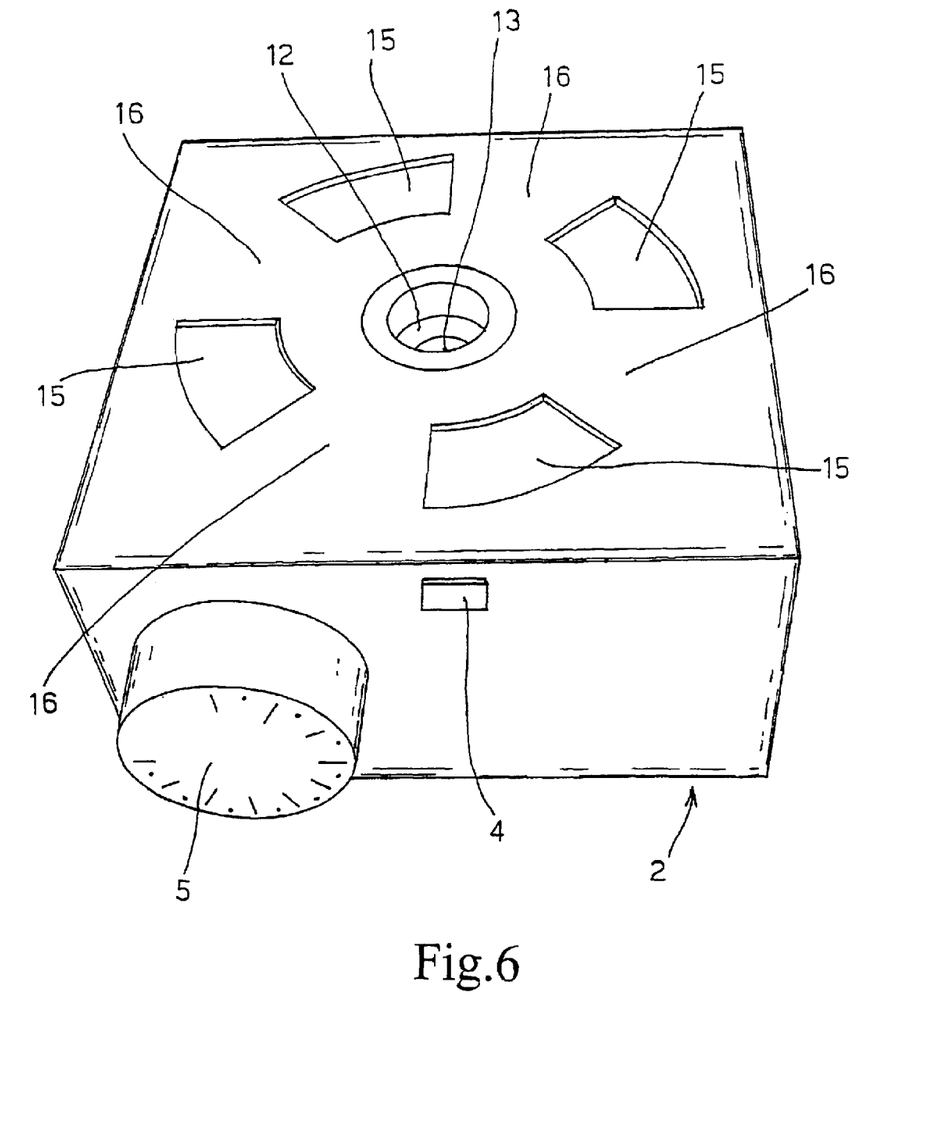
FIG. 6 is a perspective view of the support base for the container shown in FIG. 3.

Tube 6 is secured onto the internal side of the bottom of container 1 by means of a threaded member 8, e.g. welded onto the bottom of container 1, which is engaged by a complementary member 9 arranged on tube 6 near the lower end thereof. Member 8 has an axial through-hole 10 (as shown in FIG. 3) intended to receive the end portion of tube 6 and to allow communication between the tube and said duct internal to base 3. Member 8 outward projects from the bottom of container 1 to allow a tight engagement, through a seal ring 11, in a cavity 12 (as shown in FIG. 6) of the upper surface of base 3. The steam feed duct internal to base 3 has an outlet 13 (as shown in FIG. 6) opening in correspondence with the bottom of said cavity.

Moreover, for securing container 1 to base 3, the bottom of container 1 is externally equipped with a set of tongues 14 arranged to engage corresponding openings 15 (as shown in FIG. 6) in the upper face of base 3 and to be retained, upon a rotation of container 1 about its axis, by plates 16 (as shown in FIG. 6) separating openings 15. Openings 15 and plates 16 adjacent thereto are preferably arranged on an annulus concentric with cavity 12.

Figure 4:
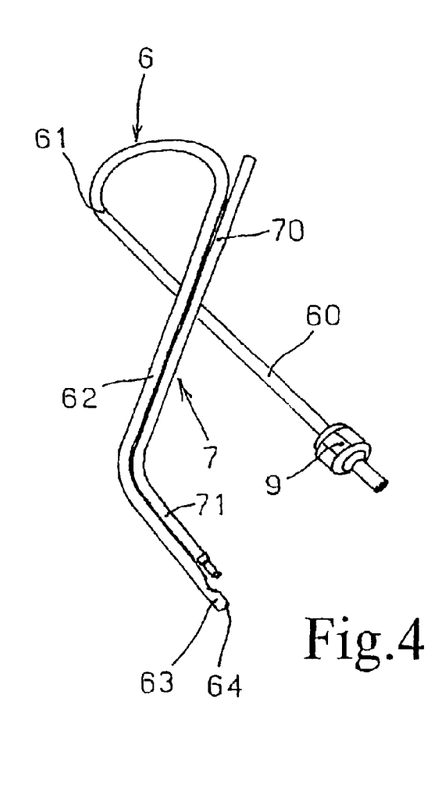
FIG. 4 show the steam and air ducts removed from the container.
Figure 5:
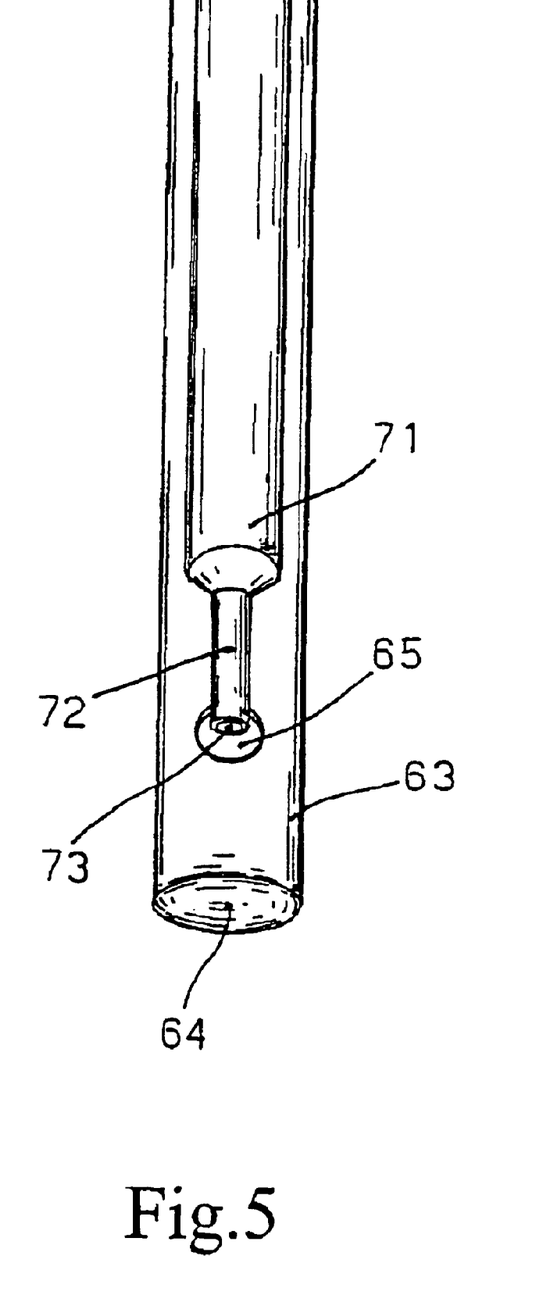
FIG. 5 is an enlarged view of a detail of FIG. 4.

Turning again to FIG. 2 and referring also to FIGS. 4 and 5, tube 6 includes; a first portion 60 with axis substantially parallel with the axis of container 1; an intermediate portion 62, substantially rectilinear and inclined downwards, connected to the first portion 60 by a bent section 61; and an end portion 63, also with substantially vertical axis, ending near the bottom of container 1. Preferably, the length of intermediate portion 62 is such that end portion 63 is substantially adjacent with the internal wall of container 1. Tip 64 of such end portion 63 is closed, but a radial opening 65 for steam outlet is provided near the tip itself. When pouring the frothy milk, such a shape prevents small quantities of the milk entering tube 6 through opening 65 from flowing out through opening 10 (as shown in FIG. 3) in the container bottom.

Air tube 7 is open at both ends and includes two sections 70, 71 arranged substantially parallel with the intermediate and end portions 62, 63, respectively, of steam tube 6. The open end of section 70 is to lie above the milk level within the container. End portion 72 of section 71, as better shown in FIG. 5, is tapered or has anyway a reduced cross-sectional size, so as to give rise to an air jet, and it ends with an axial opening 73 arranged in front of opening 65 of tube 6, so as to partly obstruct opening 65.

The operation of the described device is as follows. Once the container 1 has been filled with the required milk amount (in any case, up to a level below the upper opening of tube 7), it is placed on base 3 so that the outward projecting portion of member 8 engages cavity 12 and tongues 14 enter cavities 15. By rotating container 1, the engagement of tongues 14 beneath plates 16 is obtained. Thereafter, the desired heating time is set through timer 5, which opens the electric valve in the duct ending at the bottom of cavity 12. Thus the steam can pass from the source (inside or outside the base) to tube 6 and flow out through opening 65 thereof. Given the relative position of steam and air outlets 65, 73, steam flowing out of opening 65 originates a vacuum, which in turn causes air intake through tube 7. The steam outflow speed thus creates a turbulence on the milk bottom, making the milk become heated and mix with air supplied through tube 7. Thus a milk-air-steam mixture is created directly within the milk. When the time set is over, the electric valve is closed thereby stopping steam supply and, after rotating container 1 to release tongues 14, container 1 can be removed from base 3 to pour the frothy milk.

Referring now to FIGS. 7 to 10, a second embodiment is shown employing different and more robust means for securing container 1 to base 3. In such Figures, the elements already discussed in connection with FIGS. 1 to 6 are denoted by the same reference numerals. The arrangement of tubes 6, 7 (as shown in FIG. 4) introducing steam and air into the milk is the same as in the first embodiment.

Figure 8:
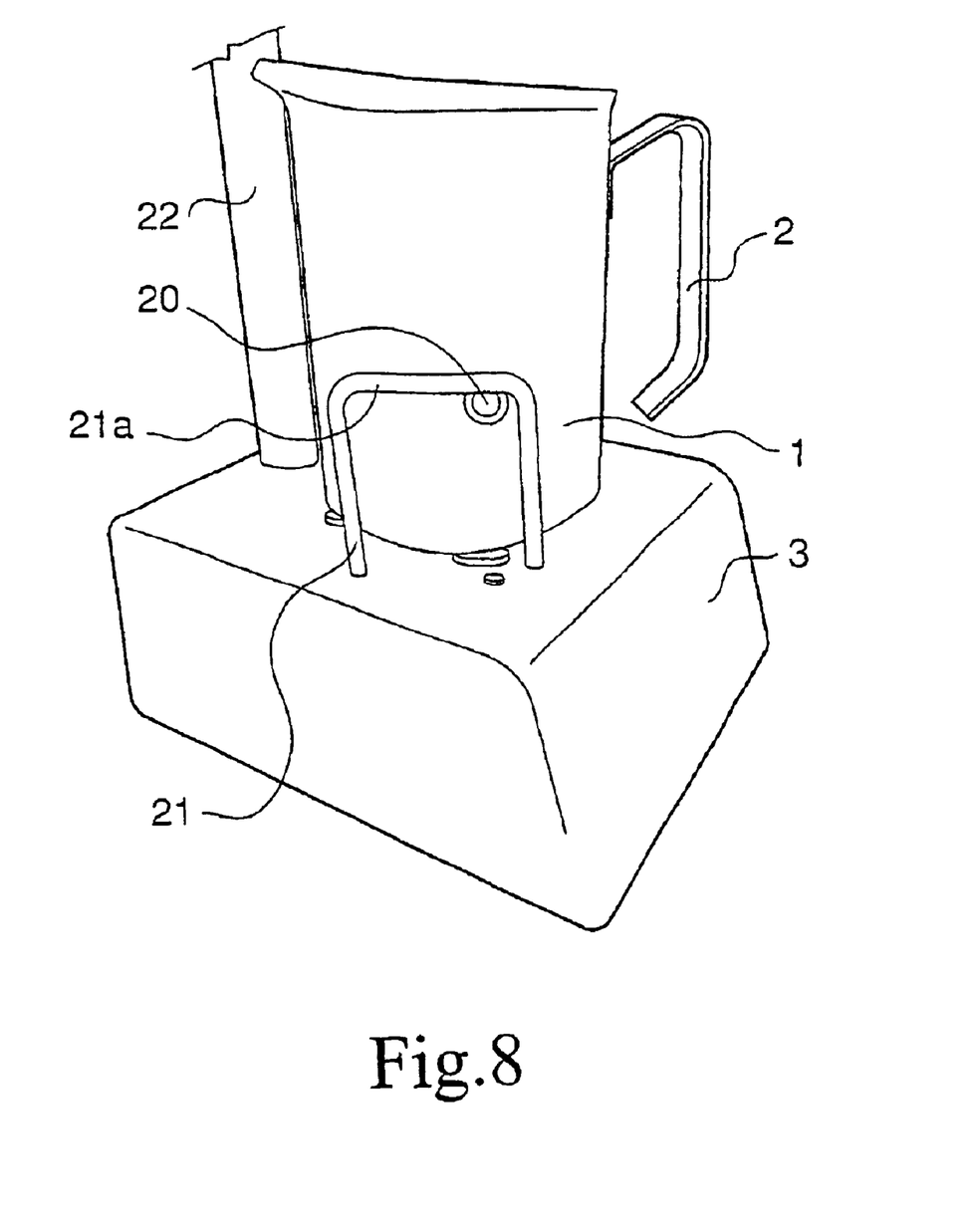
FIG. 8 is a perspective view similar to FIG. 7, showing the container secured to the base.

Container 1 has on its external wall a pair of diametrically opposed projections 20 (of which only one can be seen in the drawings), arranged to co-operate with a pair of upright retaining members 21 projecting from the upper surface of base 3. Retaining members 21 are each made by a bar, with rounded cross-sectional shape, bent to an inverted U shape. Each projection 20 engages, in operating conditions of the device, the underside of a horizontal upper section 21a of a respective retaining member 21, as shown in FIG. 8. Horizontal section 21a has a central portion slightly curved in a horizontal plane so as to somewhat conform to the curvature of the side wall of container 1.

A vertical stem 22 projecting from base 3 carries a control panel 23 on which on/off switch 4 and control knob 5 for the timer are mounted. Stem 22 will house the necessary electric wiring for the switch and the knob.

Figure 7:
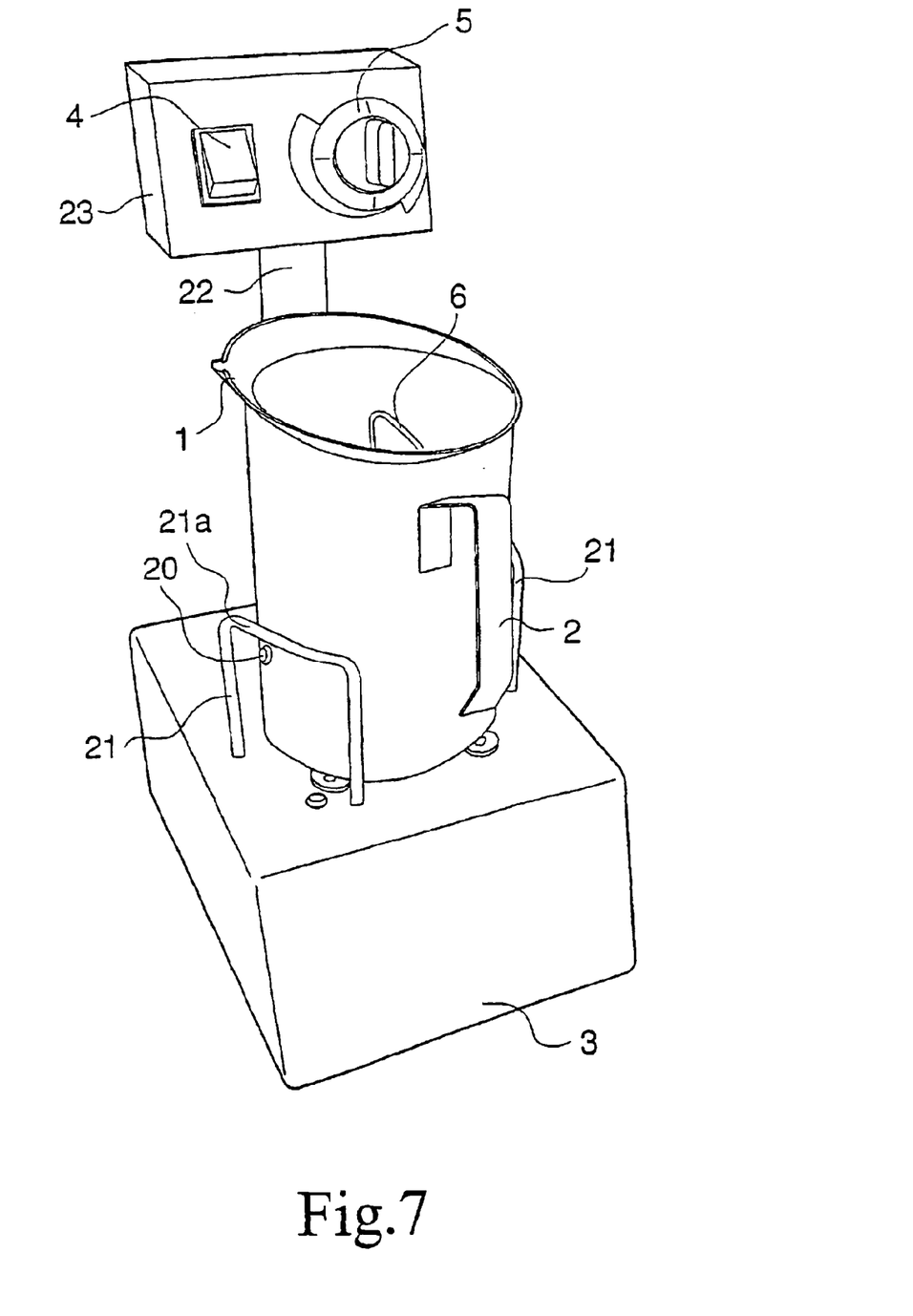
FIG. 7 is a perspective view of a second embodiment of the invention.
Figure 9:
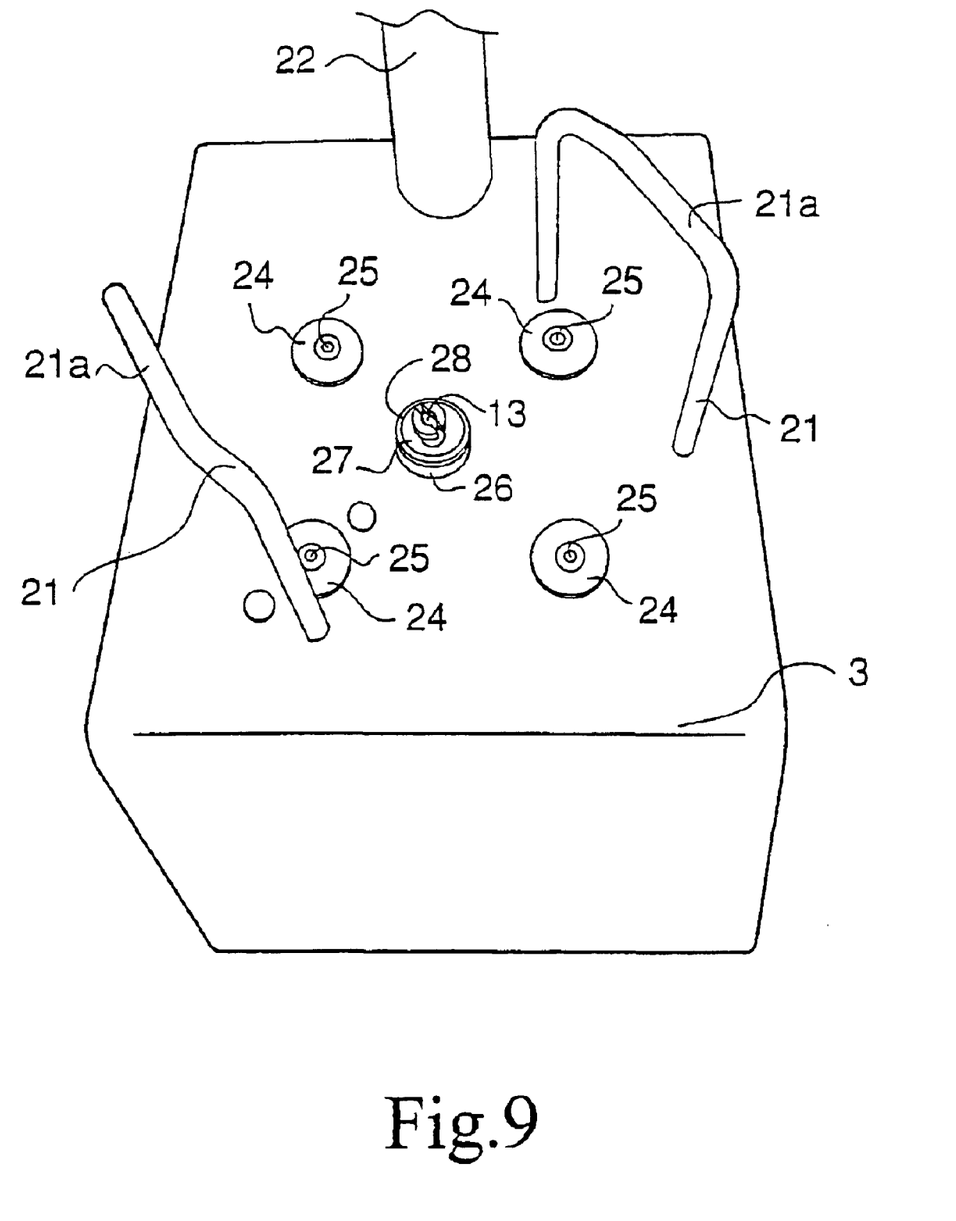
FIG. 9 is a perspective view of the base used in the second embodiment of the invention.
Figure 10:
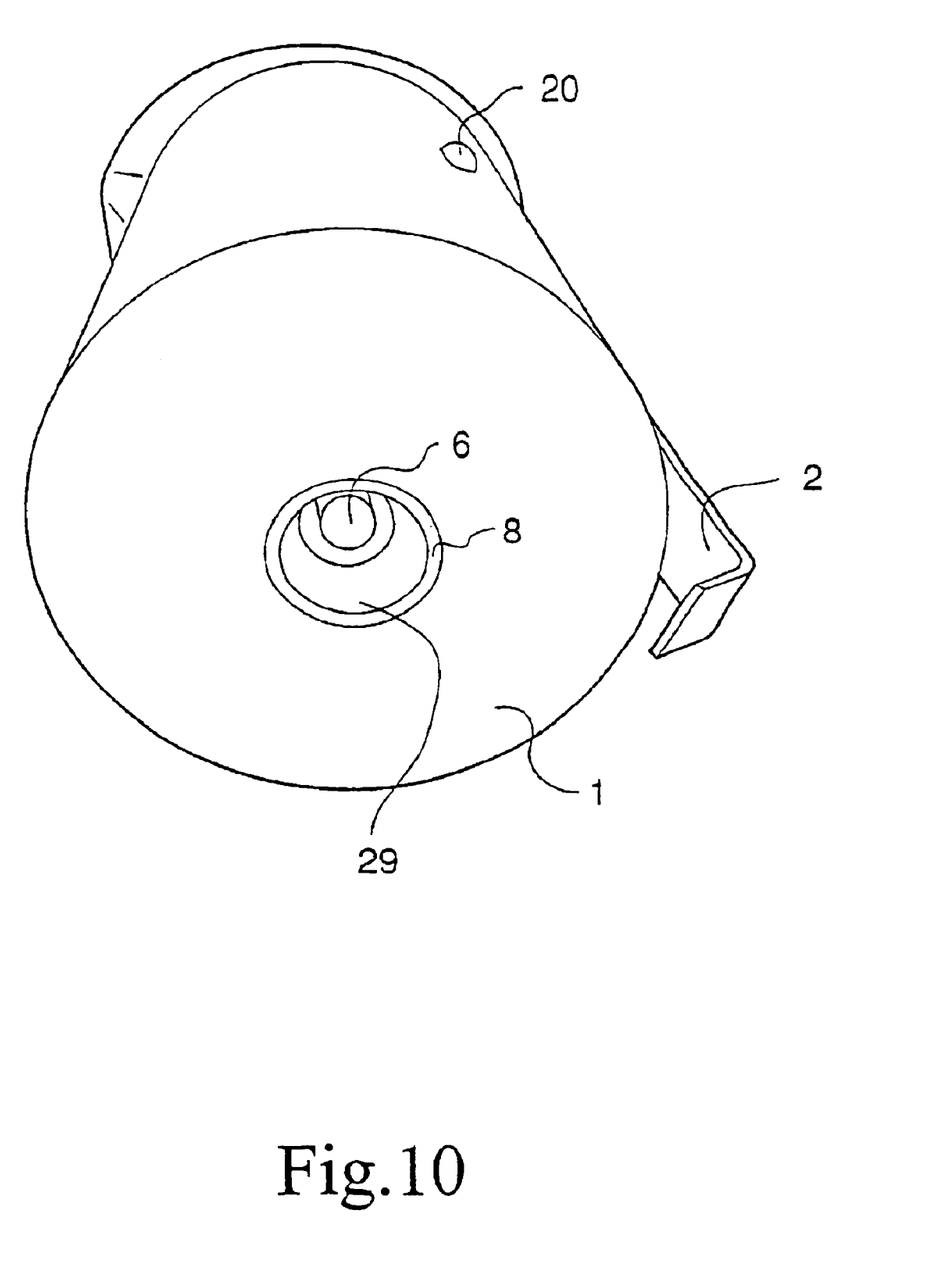
FIG. 10 is a perspective view from the bottom of the container used in the second embodiment of the invention.

As shown in FIG. 9, base 3 is also provided, on its upper surface, with a number, e.g. four, of freely rotatable ball supports 24 intended to reduce friction between the bottom of container 1 (as shown in FIG. 7) and base 3 during the container rotation needed to bring projections 20 (as shown in FIG. 10) into engagement with retaining members 21. Ball supports 24 are mounted in elastomeric members 25. One of ball supports 24 is also arranged to co-operate with a safety switch (not shown), located within base 3 and intended to cut off power supply during securing and releasing of container 1.

Base 3 has a central projection 26 housing end portion 27 of the steam feed duct located internally of base 3. Projection 26 is intended to sealingly engage, through a seal ring 28, a cavity 29 (visible in FIG. 10) provided in fastening member 8, so as to establish communication between end portion 27 of the steam feed duct and tube 6.

The operation of that second embodiment is quite similar to that of the embodiment shown in FIGS. 1 to 6. Once container 1 has been filled with milk, it will be put on base 3 between retaining members 21, so that projections 20 lie externally of such members, as shown in FIG. 7. In doing so, projection 26 engages cavity 29 and outlet opening 13 of end portion 27 of the steam supply duct comes into alignment with the inlet of tube 6. Container 1 is then rotated so as to make projections 20 move into the space defined by the corresponding retaining member 21 and engage the underside of horizontal sections 21a, as shown in FIG. 8. The co-operation between projections 20 and horizontal sections 21a will push downward container 1 against the action of the resilient support members 25 of ball supports 24. Thus the safety switch is closed. At the end of the heating time, container 1 will be rotated in the opposite direction and, as soon projections 20 are no longer retained by horizontal sections 21a, ball supports 24 will push upward the container thereby opening the safety switch and cutting off the power supply. The operations then proceed as already disclosed for the previous embodiment.

One can immediately appreciate that the invention allows solving the problems mentioned in the introduction. Actually, on the one side the device is automatic, and hence gives a product of which the quality no longer depends on the skill and/or the sensitivity of the individual operator; on the other side, the portions contacting the milk (in particular, steam and air tubes 6 and 7) can be removed from the container and washed immediately after use, thus avoiding possible pollution.

It is clear that the above description has been given only by way of non-limiting example and that changes and modifications can be made without departing from the scope of the invention. For instance, the arrangement of switch 4 and control knob 5 shown in FIG. 7 can be provided also in the embodiment of FIGS. 1 to 6.

Moreover, even if reference has been made to the preparation of milk froth and warm milk in espresso coffee machines, the device can be used to froth and/or heat other liquids, in particularly for preparing infusions.

What is claimed is:

1. An automatic device for heating and frothing a liquid, comprising a container having a bottom to which a first tube for introducing pressurized steam into the liquid is removably connected, said container being mounted on a support base where a duct for feeding steam is provided to supply said first tube with steam produced by a source, so that steam enters said first tube from the bottom, characterized in that said first tube is open and has a first end, which is arranged in correspondence of the bottom of the container inside the container, and is connected with said duct for feeding steam, and has a second end which is closed and is substantially adjacent to the bottom of the container, a radial opening being provided near said second end for letting steam pass from said first tube directly to the liquid surrounding said radial opening.

2. A device according to claim 1, characterized in that said first tube is removably connected to a fastening member secured to the bottom of the container and having an axial through-hole intended to receive said first end of the first tube.

3. A device according to claim 2, characterized in that said first tube comprises at least a first section, secured to said fastening member and having axis substantially parallel with the axis at the container, and an end section, also with axis substantially parallel with the axis of the container, comprising said second end and said radial opening and arranged adjacent to an internal wall of the container.

4. A device according to claim 3, characterized in that said first tube further comprises a substantially rectilinear and downward inclined intermediate section.

5. A device according to claim 1, characterized in that said first tube is associated with a second tube for introducing air into the liquid, which second tube is open at both ends, is arranged within the container, is secured to the first tube and is removable jointly therewith from the container.

6. A device according to claim 5, characterized in that said second tube comprises a first section, substantially parallel with said intermediate section of the first tube, and a second section, substantially parallel with the end section of the first tube and having an end portion of reduced cross-sectional size, which has an air outlet opening arranged in front of said radial opening of the first tube so as to partly obstruct such opening.

7. A device according to claim 2, characterized in that said fastening member has an outward projecting portion arranged to sealingly engage a cavity of said base, an outlet of said duct for feeding steam provided on the bottom of said cavity, in register with said axial through-hole of said fastening member.

8. A device according to claim 1, characterized in that said container has, an external surface, a plurality of tongues arranged to engage a plurality of openings in said base, adapted to be retained upon a rotation of the container about its axis, by a plurality of members on an upper surface of the base wherein said members define said openings.

9. A device according to claim 1, characterized in that said container has an external wall, having a plurality of projections arranged to engage, upon a rotation of the container about its axis, a plurality of members projecting upwardly from the base, further secured by a plurality of horizontal sections of said retaining members.

10. A device according to claim 9, characterized in that said base has a set of freely rotatable ball supports upon which the container rests when placed on the base.

11. A device according to claim 10, characterized in that said ball supports are resiliently supported within the base.

12. A device according to claim 10 or 11, characterized in that one of said ball supports co-operates with a safety switch located inside the base so as to keep said switch open when said projections are not retained by the retaining members.

13. A device according to claim 2, characterized in that said base has a central projection housing an end portion of said duct for feeding steam, said projection being arranged to sealingly engage a cavity in the bottom of said container so that an outlet of the duct for feeding steam is in register with an inlet of said first tube.

14. A device according to claim 13, characterized in that said cavity is an axial cavity of said fastening member.

15. A device according to claim 1, characterized in that said base has an on/off switch and a control knob for controlling the steam flow in said duct for feeding steam.

16. A device according to claim 15, characterized in that said on/off switch and said control knob for controlling the steam flow are carried by a control panel mounted on a vertical stem projecting from the base.

17. A device according to claim 1, characterized in that said duct for feeding steam is connected with a source of pressurized steam internal to said base.

18. A device according to claim 1, characterized in that said duct for feeding steam is connected with a source of pressurized steam external to said base, in particular with the source of pressurized steam of an espresso coffee machine.

19. A device according to claim 1, characterized in that said liquid is milk to be heated and frothed for the preparation of cappuccinos.

* * * * *